(12) United States Patent
Rajagopal et al.

(10) Patent No.: US 7,120,118 B2
(45) Date of Patent: Oct. 10, 2006

(54) MULTI-PATH ANALYSIS FOR MANAGING MACHINE COMMUNICATIONS IN A NETWORK

(75) Inventors: Priya Rajagopal, Hillsboro, OR (US); Gerhard W. Gross, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 10/029,356

(22) Filed: Oct. 18, 2001

(65) Prior Publication Data

US 2003/0076840 A1    Apr. 24, 2003

(51) Int. Cl.
*G01R 31/08* (2006.01)
(52) U.S. Cl. ............... 370/237; 370/216; 709/239; 379/221.03
(58) Field of Classification Search ......... 370/237; 709/239
See application file for complete search history.

(56) References Cited

U.S. PATENT DOCUMENTS

| | | | | |
|---|---|---|---|---|
| 5,898,673 A | * | 4/1999 | Riggan et al. | 370/237 |
| 6,134,589 A | * | 10/2000 | Hultgren | 709/227 |
| 6,816,464 B1 | * | 11/2004 | Scott et al. | 370/252 |
| 6,882,627 B1 | * | 4/2005 | Pieda et al. | 370/248 |
| 6,944,130 B1 | * | 9/2005 | Chu et al. | 370/238.1 |
| 7,051,113 B1 | * | 5/2006 | Katukam et al. | 709/239 |
| 2001/0044842 A1 | * | 11/2001 | Kawakami | 709/223 |
| 2002/0097732 A1 | * | 7/2002 | Worster et al. | 370/408 |
| 2002/0147774 A1 | * | 10/2002 | Lisiecki et al. | 709/203 |
| 2002/0172157 A1 | * | 11/2002 | Rhodes | 370/238 |
| 2002/0191250 A1 | * | 12/2002 | Graves et al. | 359/128 |
| 2003/0161321 A1 | * | 8/2003 | Karam et al. | 370/395.21 |

* cited by examiner

*Primary Examiner*—Hassan Kizou
*Assistant Examiner*—Mohammad S. Adhami
(74) *Attorney, Agent, or Firm*—Fish & Richardson P.C.

(57) ABSTRACT

Multiple traffic management nodes may be coupled with separate networks and with a connecting network. The traffic management nodes monitor and classify traffic passing through the connecting network. Current paths through the connecting network are identified and used to build detour paths through the connecting network using traffic management nodes as detour nodes. The detour paths may be shortened, thereby excluding the detour nodes from each detour path. The traffic management nodes and the detour paths may be used to create a traffic engineered system for traffic passing through the connecting network.

20 Claims, 9 Drawing Sheets

MULTI-PATH ANALYSIS FOR MANAGING MACHINE COMMUNICATIONS IN A NETWORK

BACKGROUND

The present application describes systems and techniques relating to network traffic engineering such as multi-path analysis for managing machine communications in a network.

A network is a collection of nodes coupled together with wired or wireless communication links. Each node is capable of communicating with other nodes over the communication links using network protocols. A node may be any machine capable of communicating over the network using one or more of the network protocols. Multiple networks may be combined into a larger network using an inter-networking protocol, such as Internet Protocol (IP). Such larger networks typically include packet-routing nodes (e.g., routers, gateways, switches, bridges) and network-management nodes (e.g., network servers).

Forwarding data packets within a network and between networks is generally performed by routers using one or more routing protocols to exchange information about network topology (i.e., the current layout of the interconnections forming the network). This is generally known as "topology discovery" and "dynamic routing." Each router typically maintains a graph representing the local network topology, and this graph is typically used to maintain a routing table.

Generally, two main types of routing protocols are used: interior gateway protocols (IGPs), and exterior gateway protocols (EGPs). An IGP typically is a protocol used by all the routers within a common networking system (e.g., an autonomous system within the Internet, a private network, a virtual private network, an enterprise network, etc.), which is frequently under a single administrative control. Typical examples of IGPs include distance-vector routing protocols such as Routing Information Protocol (RIP-2), and link-state routing protocols such as Open Shortest Path First (OSPF-2).

In a distance-vector routing protocol, each router sends messages (typically vectors of hop-count distances) to its neighboring routers describing the sending router's routing table. In a link-state routing protocol, each router actively monitors the state of links with the router's neighbors and broadcasts any changes in link-state to all the other routers in the network. Each router uses the link-state information to generate a directed graph that represents the network topology, which is then used to load the routing table with next-hop data.

An EGP typically is used between routers residing in different networking systems, and allows routers to exchange network reachability information. Typically, this information includes full path information for the networks to be crossed to reach other networks.

Network traffic engineering generally involves mapping traffic flows onto an existing physical topology in order to better utilize network resources. For example, MPLS (Multiprotocol Label Switching) is an IETF (Internet Engineering Task Force) initiative that routes packets based upon assigned labels in order to provide differential quality of service features for different network traffic.

Tunneling is a technique commonly used for creating virtual private networks (VPNs) on a public network. Tunneling typically involves encapsulating packets using one network protocol into packets using another network protocol.

Details of one or more embodiments are set forth in the accompanying drawings, in which like reference numerals refer to like components, and the description below. Other features and advantages may be apparent from the description and drawings, and from the claims.

DETAILED DESCRIPTION

The systems and techniques described here relate to multi-path analysis for managing machine communications in a network and to network traffic engineering generally. As used herein, the term "flow" means network traffic from one network node to another network node. The term "source routing" means a source of network traffic may specify at least part of a route to be taken through a network by requiring one or more intermediate nodes be used to get to a final destination node. The term "path" means a network route between two network nodes, which includes all segments taken between the two network nodes.

The term "segment" means an actual physical link or connection between two adjacent network nodes. Generally, segments are identified by interfaces on network nodes, but for the purposes of discussion here, segments are also identified by reference to the nodes themselves. Thus, a path between nodes Q and R, which goes through a node V, may be a two segment path identified as [Q,V,R]; which means the path consists of segment Q-V and segment V-R.

This path may also be referenced as Q->R, although this designation leaves the intermediate node(s) ambiguous. Thus, a path Q->R may refer to either or both of two different paths, [Q,V,R] and [Q,W,R].

Three or more traffic management nodes (TMNs) may be coupled with a network. These TMNs monitor and classify network traffic, including network error messages, send customized traffic to each other, and possibly a traffic management server, and support source routing, such as by using tunneling to use one or more TMNs as intermediate detour nodes for a flow. Alternate paths through the network are derived from current paths through the network, such as those generated by an existing dynamic routing protocol. The TMNs and the derived alternate paths may be used to create a traffic engineered system for messages passing through the network.

For example, network wide traffic engineering decisions may be made for flows passing through the TMNs. Network congestion may be avoided by routing flows around segments with currently high occupancy rates or without enough available bandwidth (capacity—occupancy) for the flow. Traffic may be routed around network link failures or excessive congestion. When all paths between a pair of TMNs independently have less available bandwidth than required by a flow, the traffic engineered system may choose multiple paths and divide the flow amongst those paths (i.e., traffic balancing). For applications having a preference for low jitter and/or low latency paths, such as telephony, the traffic engineered system may select the optimal path using a configurable algorithm.

Figure 1:
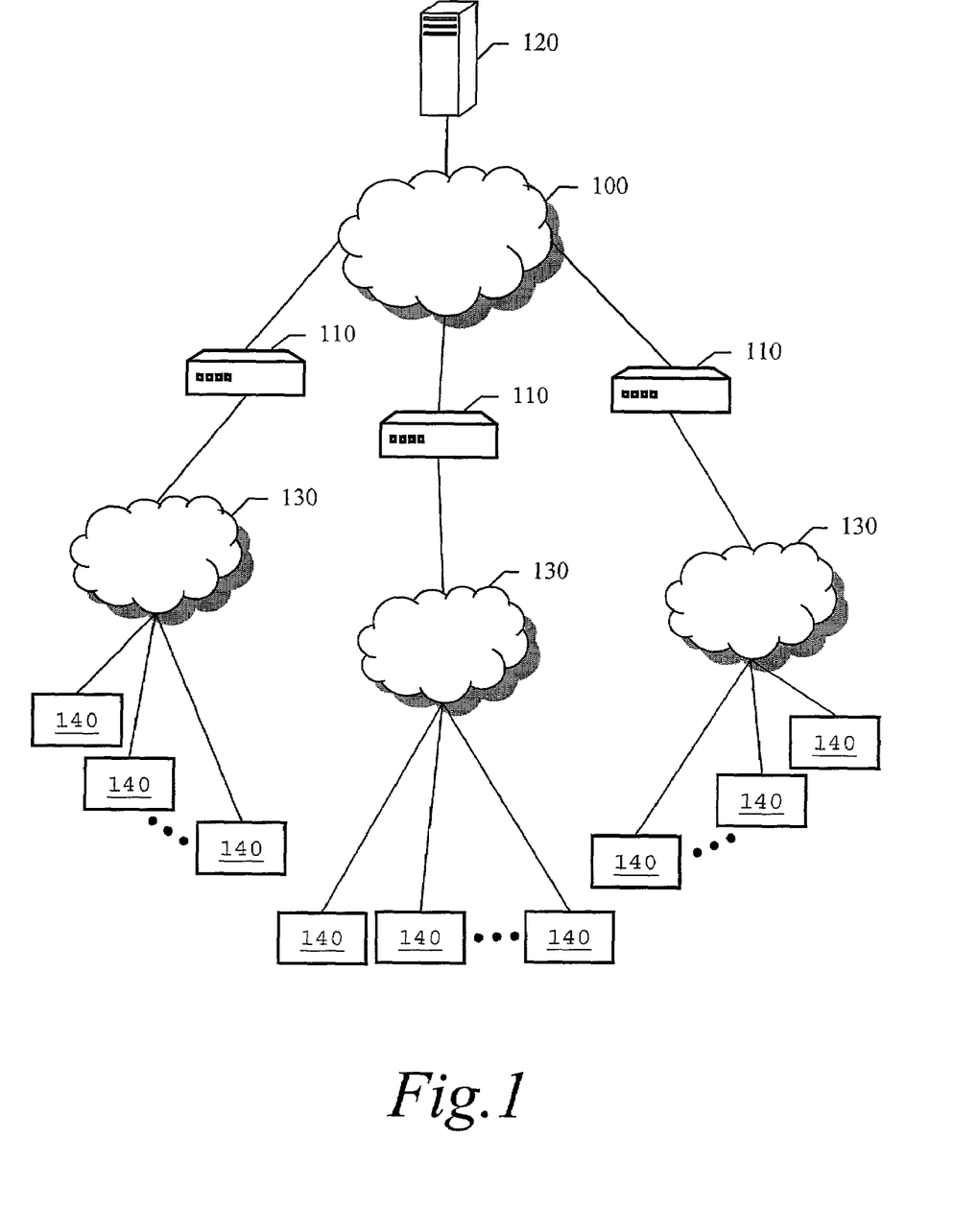
FIG. 1 is a block diagram illustrating an example operational environment for multi-path analysis.

FIG. 1 is a block diagram illustrating an example operational environment for multi-path analysis. A network 100 provides communication links for multiple network machines 140. The network 100 may be any packet-switched network that allows the network machines 140 to communicate by sending messages through the network 100. The network 100 may be a local area network (LAN), a wide area network (WAN), a metropolitan area network (MAN), the Internet, an autonomous system within the Internet, a private network, an enterprise network, etc. The network machines 140 may be any network machines capable of communicating with each other using one more network protocols, including desktop computers, laptops, host computers, servers, personal digital assistants (PDAs), mobile phones, etc.

Coupled with the network 100 and between the network machines 140 are three or more traffic management nodes (TMNs) 110. Each TMN 110 is coupled with a network 130 serving its respective network machines 140. The TMNs 110 monitor network traffic passing between the network 100 and each network 130. The TMNs 110 may also function as routers for the network traffic. The TMNs 110 may be new hardware nodes installed into an existing network or a new network, or the TMNs 110 may be existing nodes that have software installed to enable the functionality described below.

The TMNs 110 create a traffic engineered system for messages passing through the network 100. The TMNs 110 are able to classify the network traffic based upon network layer type, as well as source and destination specifications (e.g., source and destination IP addresses and ports in an IP network). Each TMN 110 supports source routing, and each TMN is able to send customized traffic to the other TMNs 110. Each TMN 110 listens for network error messages (e.g., ICMP (Internet Control Message Protocol) messages in IP networks).

A Traffic Management Server (TMS) 120 may be provided to function as a central point of control and data analysis. When a TMS 120 is provided, the TMS 120 may receive topology information and other network data from the TMNs 110, perform multi-path analysis to identify alternate paths through the network 100, maintain network topology data and multi-path tree data, including attribute information discussed in detail below, communicate control information to the TMNs 110, and function as an administrative interface for the traffic engineered system.

When no TMS 120 is provided, its functions and responsibilities may be distributed among the TMNs 110. The customized traffic between the TMNs 110, and also any communications between the TMNs 110 and the TMS 120, may be implemented using standard network management protocols (e.g., Simple Network Management Protocol (SNMP)). The TMNs 110 may also maintain periodic byte counts per flow, as discussed further below.

In addition, the TMNs 110 may originate tunnels (i.e., encapsulate a flow within another flow) and terminate tunnels (i.e., de-capsulate a flow). The TMNs 110 may perform source routing using tunneling. For example, if a first TMN is to send a flow to a second TMN via a third TMN, the first TMN may encapsulate the flow into a flow sent to the third TMN. The encapsulated flow is de-encapsulated at the third TMN and is then sent to the second TMN. Such use of tunneling need not use different network protocols (e.g., both the encapsulated flow and the de-encapsulated flow may use IP).

Alternatively, the TMNs 110 perform source routing using MPLS or some other capability embedded in routers residing in the network 100.

Figure 2:
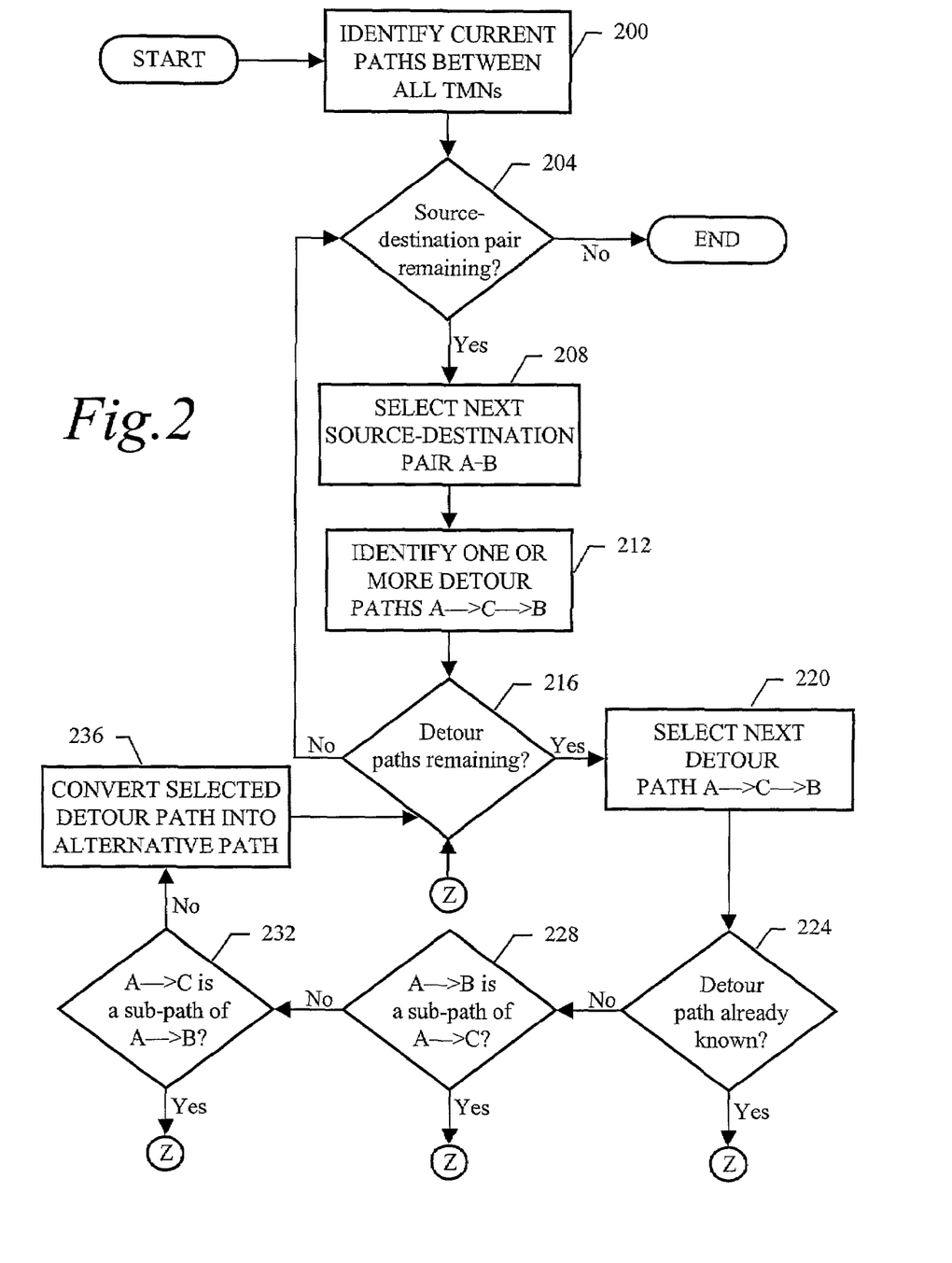
FIG. 2 is a logic flow diagram illustrating a process for deriving alternate routes through a network.

FIG. 2 is a logic flow diagram illustrating a process for deriving alternate routes through a network. The process begins at block 200, in which current network paths are discovered for all TMNs acting as both source and destination. The paths identified in this topology discovery block may be the paths determined through choices made by an existing dynamic routing algorithm used in the network.

If all TMNs are able to send messages to all other TMNs through the network, the result of block 200 will be at least Y current paths, where:

$$Y = X \cdot (X-1), \quad (1)$$

in which, X is the number of TMNs. Some of the network paths discovered in block 200 may be mirror images of each other.

The method for identifying the current paths in block 200 may include many techniques and many variations. For example, a route tracing program may be used by each TMN separately to discover the current network paths to the other TMNs (e.g., traceroute in IP, which increments the IP time to live (TTL) field in the IP header in successive datagrams and tracks returned ICMP messages to determine a current path from node A to node B). Alternatively, a route recording option may be used as part of an echo-back utility (e.g., the ping program in IP using the RR (record route) option). The echo-back utility may be customized so that the current paths are discovered in a cascading fashion in block 200 (i.e., receipt of a discover paths echo-back message by a TMN causes that TMN to send out its own discover paths echo-back message to all other TMNs).

Information regarding current paths may be shared and consolidated in a distributed fashion or through a Traffic Management Server. Alternatively, the method for identifying the current paths in block 200 may include monitoring messages sent as part of a dynamic routing protocol, such as link-state messages.

Following block 200, a check is made in block 204 to determine if there are any source-destination pairs remaining to be checked for alternate paths. If there are not, the process ends. Otherwise, control passes to block 208. In general, each source-destination pair A-B, where A is a source TMN and B is a destination TMN, is checked once. Thus, block 204 passes control to block 208 Y times, where Y is from equation (1) above.

However, block 204 may also allow for multiple iterations through the Y number of source-destination pairs to enable construction of alternate paths from previously created alternate paths. Block 204 may allow a fixed number of iterations, or block 204 may pass control to block 208 whenever at least one new alternate path was created in a previous pass through blocks 208 through 236. The process of FIG. 2 may also be recursive.

In block 208, a next source-destination pair A-B is selected. In block 212, one or more detour paths A->C->B are identified. The detour paths A->C->B may be identified in block 212 by checking for all TMNs for which, when used as a detour node C, at least one known path exists from A to C, and at least one known path exists from C to B. The known paths A->C and C->B include the current paths identified in block 200 and may also include alternate paths identified and created/converted in blocks 212 through 236.

Following block 212, a check is made in block 216 to determine if any detour paths A->C->B remain to be checked as potential alternate paths for the source-destination pair A-B. If so, control passes to block 220, in which the next detour path from the one or more detour paths A->C->B is selected. If not, control passes back to block 204.

Blocks 224 to 232 check if the detour path is repetitive of a known path. If not, the detour path is converted into an alternate path for the source-destination pair A-B in block 236. Known paths include the current paths identified in block 200 and may also include alternate paths identified and created in blocks 212 through 236.

Thus, once the next detour path is selected in block 220, a check is made in block 224 to determine if an alternate path to be made from the selected detour path is already a known path and/or is substantially similar to a known path for the source-destination pair A-B. If so, control passes back to block 216. If not, control passes to block 228. Substantial similarity between paths is discussed further below in connection with FIGS. 4 and 5B.

In block 228, a check is made to determine if the path A->B is a sub-path of A->C, excluding the end nodes (e.g., the path [A,Q,R,B] is a sub-path of the path [A,Q,R,S,C]). If so, the selected detour path is repetitive of a known path, and control passes back to block 216. If not, control passes to block 232.

In block 232, a check is made to determine if the path A->C is a sub-path of A->B, excluding the end nodes (e.g., the path [A,V,C] is a sub-path of the path [A,S,V,B]). If so, the selected detour path is repetitive of a known path, and control passes back to block 216. If not, control passes to block 236.

In block 236, the selected detour path A->C->B is converted into an alternate path for the source-destination pair A-B. The alternate path resulting from the selected detour path may be a simple concatenation of the two paths A->C and C->B around the node C (e.g., a path [A,Q,R,C] and a path [C,R,S,B] becomes the alternate path [A,Q,R,C,R,S,B]). Alternatively, the alternate path resulting from the selected detour path may be a simple concatenation of the two paths A->C and C->B around the node C, with repeated nodes on either side of C removed up to the last repetition (e.g., a path [A,Q,R,V,C] and a path [C,V,R,S,B] becomes the concatenated path [A,Q,R,V,C,V,R,S,B], which then becomes the alternate path [A,Q,R,S,B]).

Following block 236, control passes back to block 216. Once each of the potential alternate paths for each of the source-destination pairs of TMNs have been checked, the process ends.

Figure 3A:
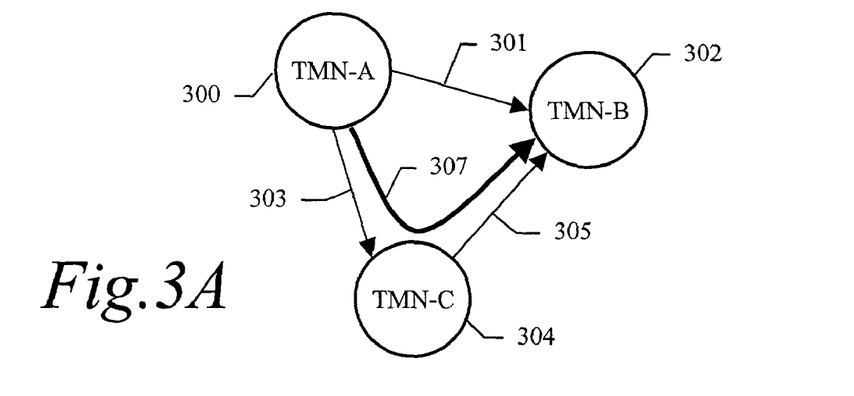
FIG. 3A is block diagram illustrating a multi-path analysis for a single path using three network nodes.
Figure 3B:
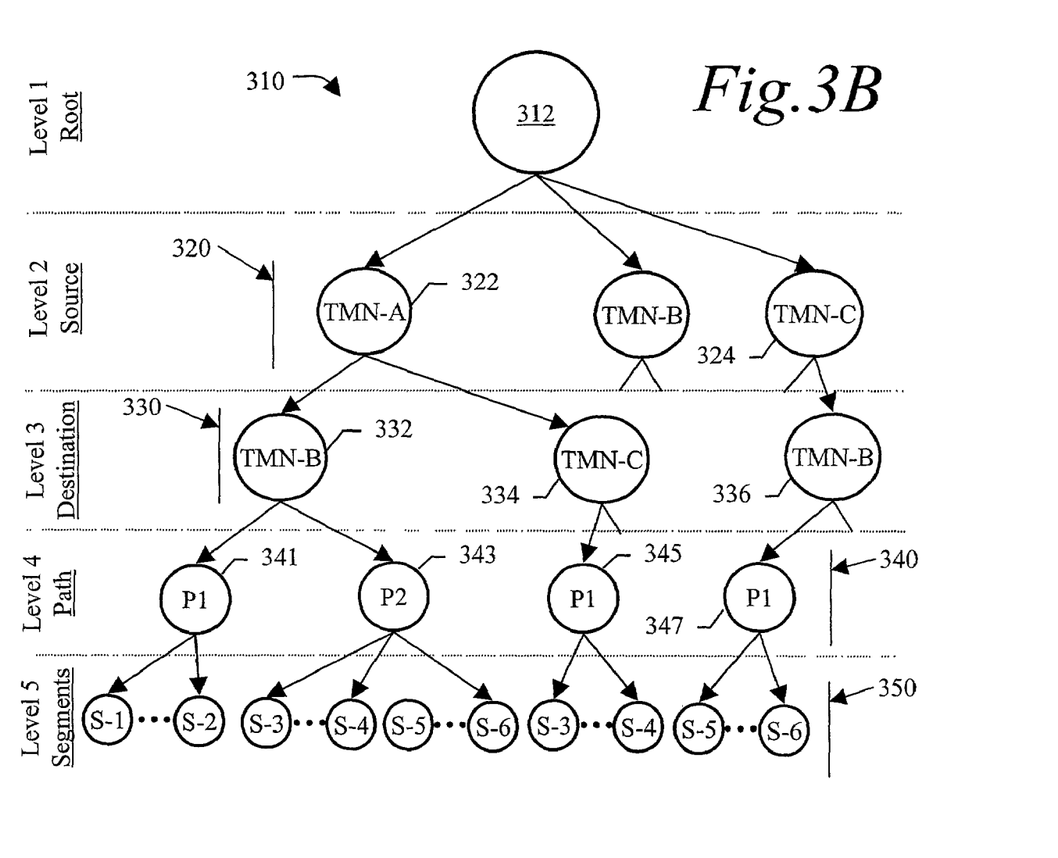
FIG. 3B is a block diagram illustrating portions of an example multi-path tree created for the three network nodes of FIG. 3A using the process of FIG. 2.

FIG. 3A is block diagram illustrating a multi-path analysis for a single path using three network nodes. FIG. 3B is a block diagram illustrating portions of an example multi-path tree 310 created for the three network nodes of FIG. 3A using the process of FIG. 2. Referring now to FIGS. 3A and 3B, three Traffic Management Nodes, TMN-A 300, TMN-B 302 and TMN-C 304, are coupled with a network. During topology discovery, three current network paths 301, 303, 305 through the network are identified. These paths are the current routes taken by packets traveling through the network between TMN-A 300 and TMN-B 302, TMN-A 300 and TMN-C 304, and TMN-C 304 and TMN-B 302, respectively.

The example multi-path tree 310 of FIG. 3B has five levels: a root level one having a root node 312, a source level two having source nodes 320, a destination level three having destination nodes 330, a path level four having path nodes 340, and a segments level five having segment nodes 350. In the example multi-path tree 310, current paths and alternate paths are stored within the same tree data structure 310, starting from the root node 312.

However, the multi-path data may be stored in many different data structures using many different data models and data formats. For example, the current paths may be stored separately from the alternate paths. Moreover, the multi-path tree 310 may be only a symbolic representation of one or more data structures used in practice. For example, the source-destination pairs of levels two and three may be stored as a two level lookup table, the paths of level four may be stored as linked lists, and the segments of level five may be stored in a single array.

In the example multi-path tree 310, a current path node 341 is a child of a destination node 332, which is a child of a source node 322. The current path node 341 represents the current path 301 from TMN-A 300 to TMN-B 302. The current path node 341 has children segment nodes S-1 through S-2, which represent the incoming interfaces along the path 301.

A current path node 345 is a child of a destination node 334, which is a child of the source node 322. The current path node 345 represents the current path 303 from TMN-A 300 to TMN-C 304. The current path node 345 has children segment nodes S-3 through S-4, which represent the incoming interfaces along the path 303.

A current path node 347 is a child of a destination node 336, which is a child of a source node 324. The current path node 347 represents the current path 305 from TMN-C 304 to TMN-B 302. The current path node 347 has children segment nodes S-5 through S-6, which represent the incoming interfaces along the path 305.

During topology discovery, the current path nodes 341, 345, 347 are added to the multi-path tree 310. Following this, detour paths are identified and converted into alternate paths. For example, a detour path 303–305 is identified and converted into an alternate path 307 for the current path 301. In the multi-path tree 310, an alternate path node 343 is created as a child of the destination node 332, which is a child of the source node 322. The alternate path node 343 represents the alternate path 307 from TMN-A 300 to TMN-B 302, via TMN-C 304. The alternate path node 343 has children segment nodes S-3 through S-4 and S-5 through S-6, which represent the incoming interfaces along the path 307.

The children segment nodes for each alternate path may include a segment representing the incoming interface for a detour node, such as TMN-C 304 in the example illustrated. For example, in an implementation using tunneling to perform source routing, the children segment nodes for each alternate path would necessarily include one or more segments representing the incoming interface(s) for each detour node along the alternate path (e.g., the alternate route 307 is taken by TMN-A 300 encapsulating a flow destined for TMN-B 302 into a flow destined for TMN-C 304). Moreover, one or more attribute values may be stored for both the paths 340 and the segments 350 in the tree 310.

Figure 4:
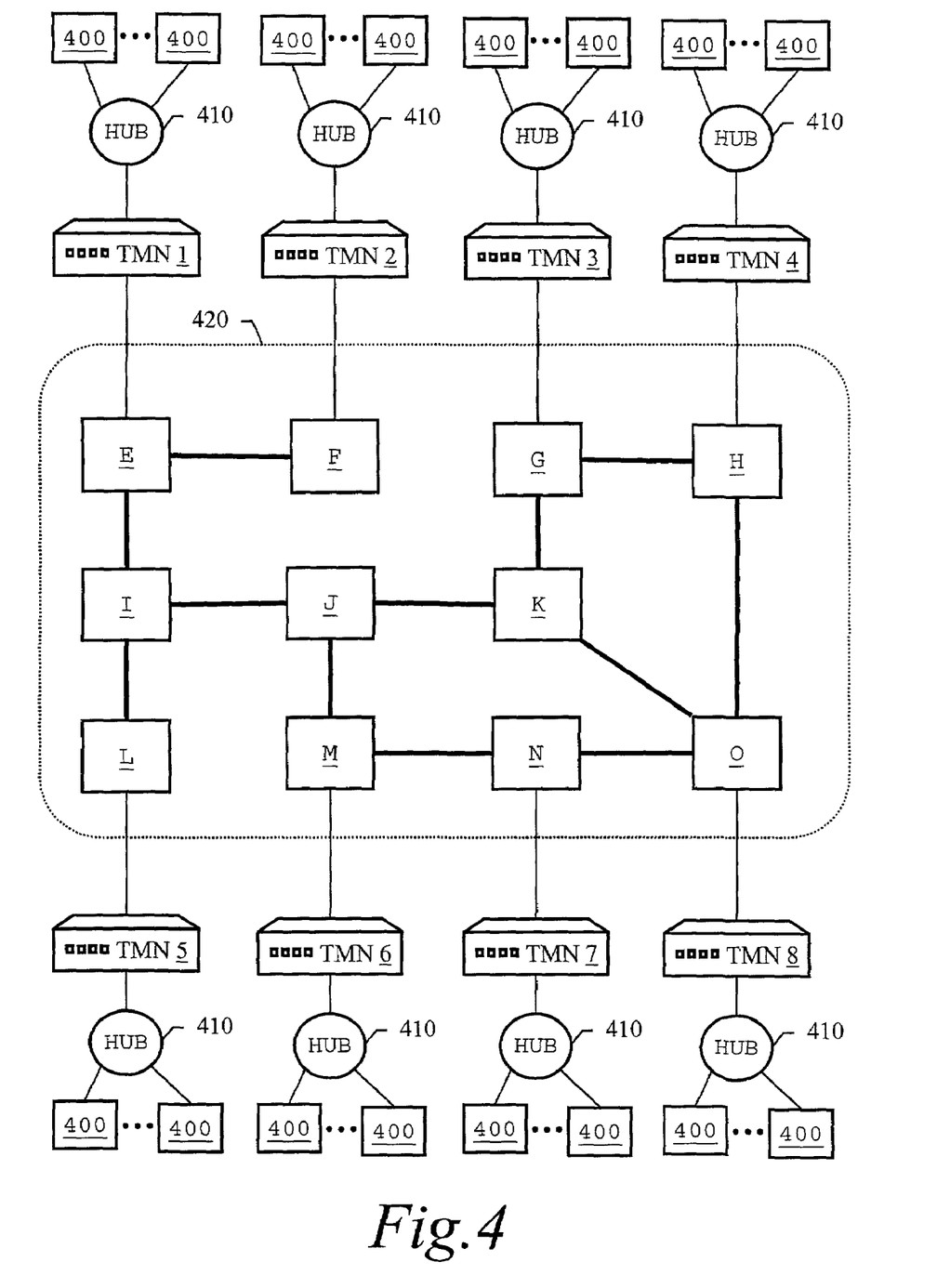
FIG. 4 is a block diagram illustrating an example network including traffic management nodes employing dynamic multi-path analysis.

FIG. 4 is a block diagram illustrating an example network including traffic management nodes employing dynamic multi-path analysis. Multiple end hosts 400 are coupled with multiple hubs 410, which are in turn coupled with multiple TMNs 1, 2, 3, 4, 5, 6, 7, 8. The TMNs 1, 2, 3, 4, 5, 6, 7, 8 are coupled with a public network 420, such as the Internet, which includes multiple routers E, F, G, H, I, J, K, L, M, N, O. The TMNs 1, 2, 3, 4, 5, 6, 7, 8 use the public network 420 to communicate with each other and may create a VPN for the end hosts 400 using either a separate protocol or the network protocol of the public network 420.

Figure 5A:
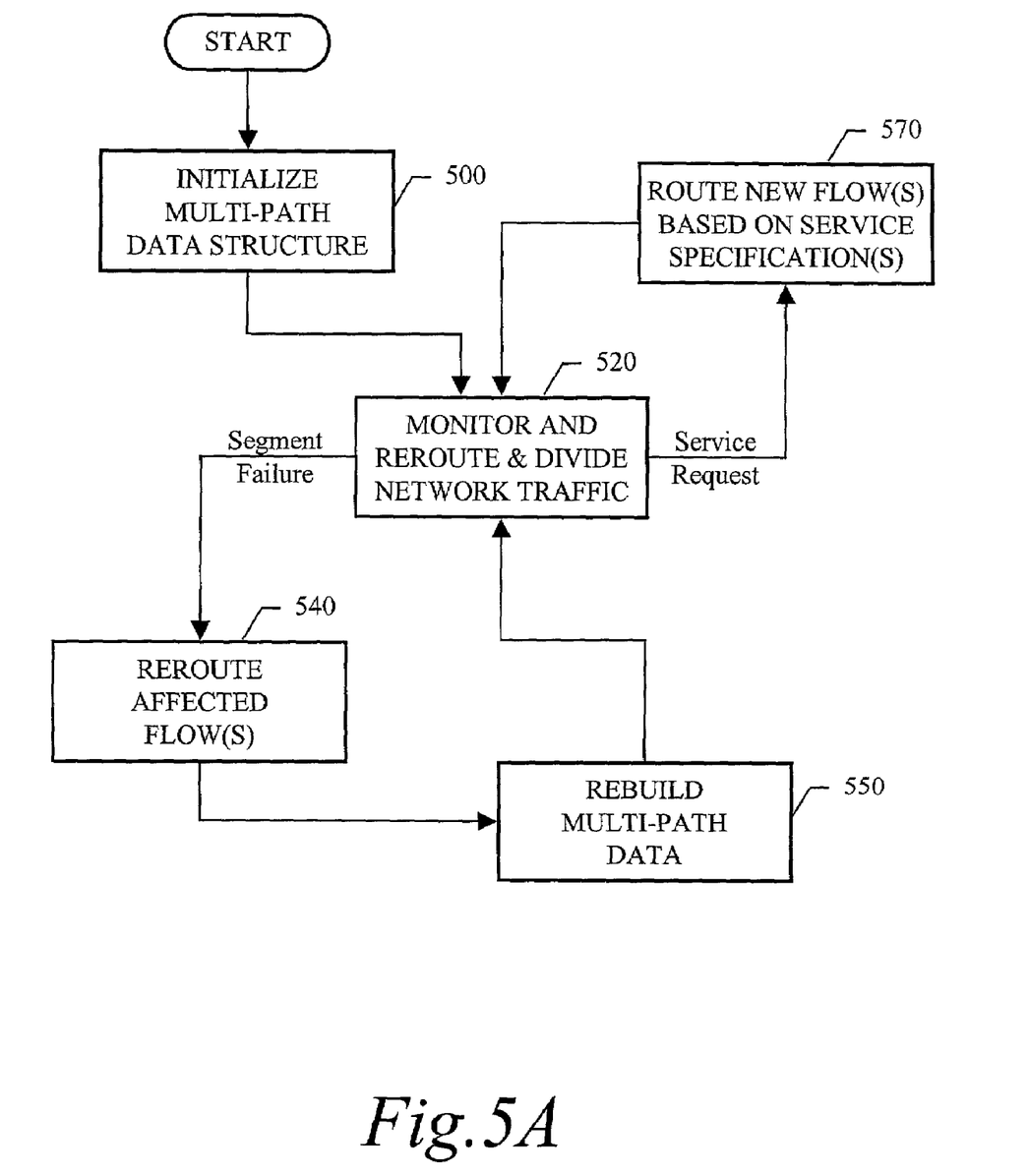
FIGS. 5A, 5B, 5C, 5D and 5E are logic flow diagrams illustrating a process for managing machine communications in a network.

FIGS. 5A, 5B, 5C, 5D and 5E are logic flow diagrams illustrating a process for managing machine communications in a network. Referring to FIG. 5A, the process begins at block 500, in which a multi-path data structure is initialized. Following this, network traffic among the TMNs is monitored in block 520, and each TMN reroutes or divides one or more flows through alternate paths when occupancy (in-use bandwidth) for current paths approaches capacity (e.g., occupancy exceeds 98% of capacity), thereby avoiding network congestion.

If a segment failure is identified in block 520, affected flows are rerouted in block 540, the multi-path data is rebuilt in block 550, and the process returns to block 520. If a service specification for a network communication (e.g., a service request that specifies minimum bandwidth, jitter, and/or latency requirements) is received in block 520, an appropriate route for the network communication is selected in block 570, and the process returns to block 520. For example, a user may submit to the network a service request for a flow, where the request specifies a bandwidth requirement and flow endpoint details (e.g., the source and destination IP addresses and port numbers in an IP network).

Figure 5B:
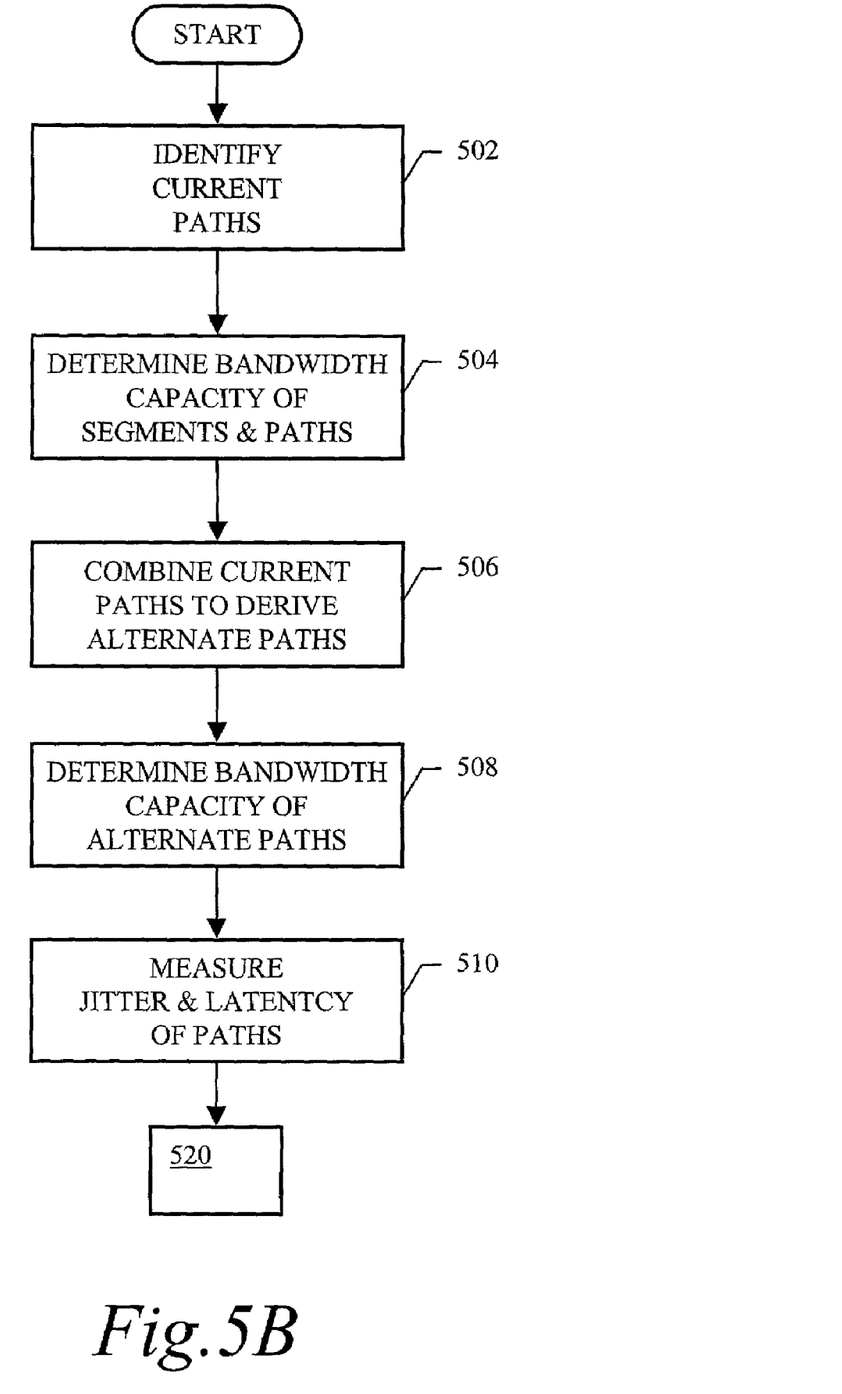

FIG. 5B is a logic flow diagram illustrating the initialization of the multi-path data structure performed in block 500 of FIG. 5A. The initialization begins at block 502, in which current paths through the network are identified for traffic sent among the TMNs. For example, in FIG. 4, a current path from TMN 6 to TMN 8 may be identified as [6,M,N,O,8]. The types of methods that may be used are discussed above in connection with block 200 of FIG. 2.

Following block 502, bandwidth capacities for the identified segments and paths are determined in block 504. The bandwidth capacity of each segment may be determined using a packet burst analysis. For example, packet bursts, or streams, may be sent through each segment in a network from multiple sources (e.g., TMNs).

Each segment is tested separately. The start of the traffic may be synchronized so that it propagates through a segment at the same time so the segment may be flooded with traffic. The traffic is measured at one or more final destination nodes, which also may be the source nodes, and divided by the width of the time window in which the burst was received. This yields a bandwidth capacity of the segment.

For networks where the nodes are unsynchronized in time by seconds or more, the test traffic may include a longer packet burst, or stream, from each source node. In such cases, the receiving nodes measure bytes received over short intervals on the order of fractions of a second. For each interval, the first packet and last packet time stamps should be recorded. At each destination, the first and last interval are discarded, as well as any interval in which no traffic was recorded.

Of the remaining intervals, the one with the lowest amount of bytes recorded may be selected for processing, since this interval is more likely to be one in which traffic from all sources was simultaneously propagating through the segment being tested. The bandwidth at each receiving node is calculated by dividing the bytes received in the selected interval by the interval time width. The total segment capacity is the sum of all the bandwidth results from the individual receiving nodes.

If the network being tested is not lightly loaded, these tests may still be performed. For example, the test traffic may be tagged as high priority, if the network routing/forwarding nodes support high priority traffic. Alternatively, the tests may be run multiple times, and the capacity of a segment may be approximated as the highest valued bandwidth result.

Additional details concerning packet burst analysis systems and techniques are described in U.S. Patent Application entitled "SYSTEM AND METHOD FOR DETERMINING SEGMENT AND LINK BANDWIDTH CAPACITIES", filed Mar. 30, 2001, and assigned U.S. application Ser. No. 09/823,132.

The bandwidth capacity of each path is equal to the lowest bandwidth capacity of the segments making up the path. Once the bandwidth capacity for the segments and paths have been identified, they may be stored in the multi-path data structure. Additionally, the multi-path data structure may store for each segment an operational status attribute, initially set to true.

Following block 504, the identified current paths are combined in block 506 to derive alternate paths through the network for each source-destination pairing of the TMNs. For example, in FIG. 4, an alternate path for TMN 6 to TMN 8 may be derived by combining a current path from TMN 6 to TMN 3 (e.g., [6,M,J,K,G,3]) with a current path from TMN 3 to TMN 8 (e.g., [3,G,K,O,8]) to create the alternate path (e.g., [6,M,J,K,G,3,G,K,O,8]). More than two current paths may be combined; thus another alternate path for TMN 6 to TMN 8 may be [6,M,J,K,G,3,G,H,4,H,O,8].

The bandwidth capacity for each new alternate path is determined and stored in block 508. The bandwidth capacity for each new alternate path is equal to the lowest bandwidth capacity of the paths composing the new alternate path. For example, if segment M-N, segment K-O and segment G-H are the three segments in the network 420 with the lowest bandwidth capacity, and have a bandwidth capacity of 1.0 Mbps, 1.5 Mbps and 2.0 Mbps respectively, then the bandwidth capacity of the current path 6->8 is 1.0 Mbps, the bandwidth capacity of the alternate path 6->3->8 is 1.5 Mbps, and the bandwidth capacity of the alternate path 6->3->4->8 is 2.0 Mbps. The bandwidth capacity for each new alternate path may be stored in the multi-path data structure. Additionally, when current paths and alternate paths are stored in the same data structure, a "direct path" flag may be used to distinguish between current paths and alternate paths.

As discussed previously in connection with FIG. 2, a new detour path typically is not converted into an alternate path if the detour path is substantially similar to a known path. This substantial similarity may be assessed by comparing the segment list for the detour path with the segment list for the known path. If either segment list, excluding segments for receiving TMNs and repeated intermediate routers, is a subset of the other, then the two paths are substantially similar.

For example, if a current known path 6->8 is [6,M,J,K,O,8], then a detour path 6->3->8 [6,M,J,K,G,3,G,K,O,8] will not be converted into an alternate path. Likewise, if an alternate known path 6->3->7 is [6,M,J,K,G,3,G,K,O,N,7], then a detour path 6->8->7 [6,M,J,K,O,8,O,N,7] will not be converted into an alternate path, unless the alternate known path 6->3->7 is also removed for being the longer of the two alternate paths.

Following block 508, initial jitter and latency measurements are made for all known paths, and these measurements may be stored in the multi-path data structure in block 510. The jitter measurement along a path may be approximated by sending a short packet burst with evenly spaced packets from a network source (e.g., a TMN) to a network destination (e.g., another TMN). The source and destination record the number of packets received, the sum of the inter-packet spacing over the entire burst, and the sum of the squares of the inter-packet spacing over the entire burst.

The total jitter may be interpreted as the sum of the phase jitter and the inter-packet jitter. Phase jitter refers to a difference between the average inter-packet departure and arrival times. Inter-packet jitter refers to the magnitude by which the inter-arrival spacing of each packet at the destination is distributed about the average inter-arrival spacing at the destination. This magnitude may be measured as a standard deviation about the average.

The phase jitter (PhJ) is the difference between the average inter-packet spacing at the destination subtracted from that at the source:

$$PhJ = (\Sigma x/(n-1))_{dest} - (\Sigma x/(n-1))_{src} \qquad (2)$$

and the inter-packet jitter (IJ) is the standard deviation of the inter-packet times:

$$IJ = \sigma = sqrt((n\Sigma x^2 - (\Sigma x)^2)/(n^2)) \qquad (3)$$

and the total jitter (J) is:

$$J = PhJ + IJ \qquad (4)$$

where $\Sigma x$ is the sum of the inter-packet spacing over the entire burst (i.e., x is the time difference between adjacent packets), and n is the number of packets minus one.

Additional details concerning these jitter measurement systems and techniques are described in U.S. Patent Application entitled "A METHOD FOR DETERMINING PHASE JITTER AND PACKET INTER-ARRIVAL JITTER BETWEEN NETWORK END POINTS", filed Sep. 10, 2001, and assigned U.S. application Ser. No. 09/948,705.

The latency measurement may be conducted using an echo-back utility (e.g., the ping program in IP). For example, a source TMN sends an echo request along a path to a destination TMN, which returns an echo reply message to the source TMN. The latency is then determined using:

$$PL = (ECDT - ERAT)/2 \qquad (5)$$

where PL is path latency, ECDT is echo request departure time, and ERAT is echo reply arrival time. Following block 510, the control passes to block 520 from FIG. 5A.

Figure 5C:
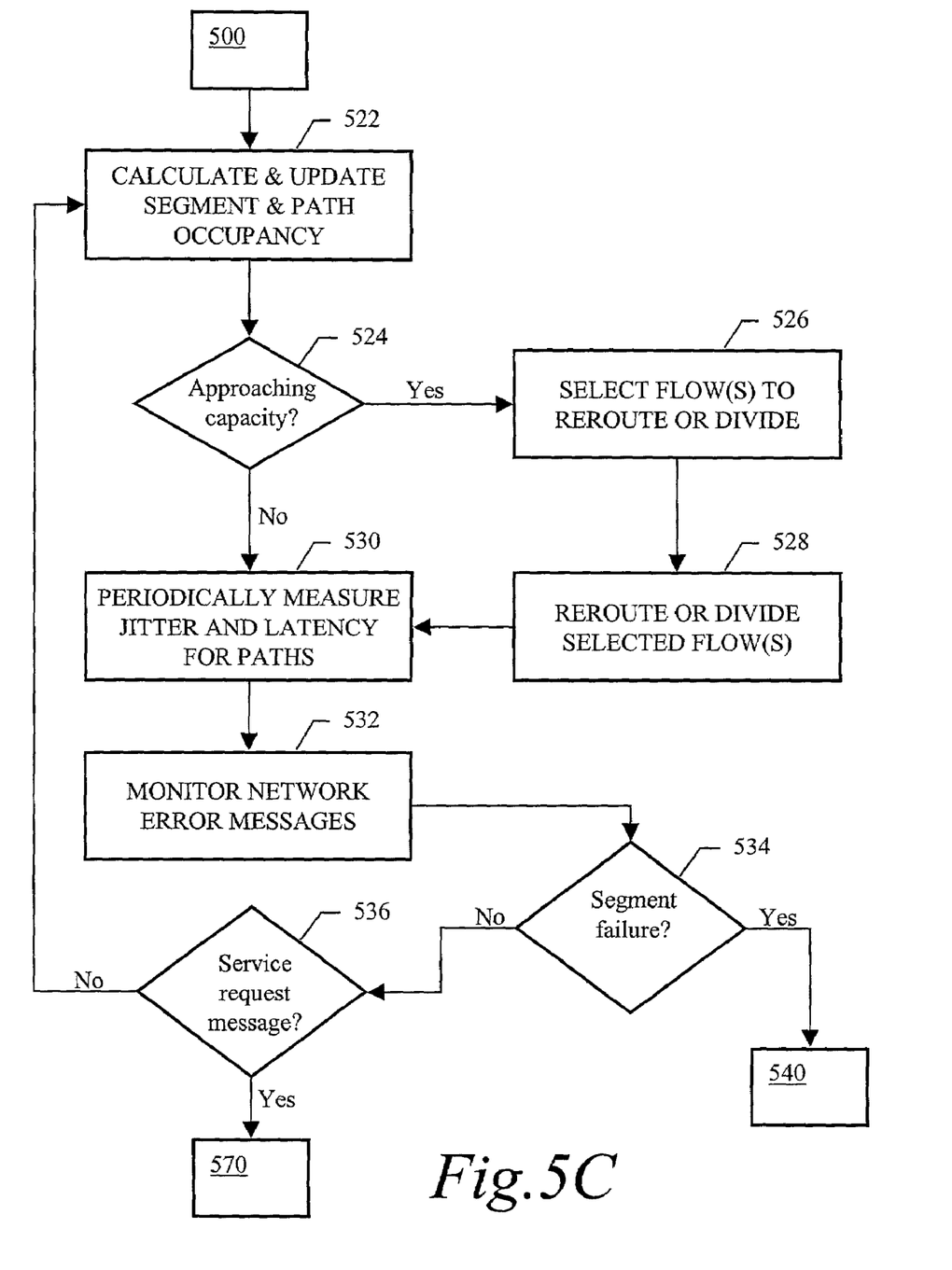

FIG. 5C is a logic flow diagram illustrating the monitoring of network traffic among the TMNs performed in block 520 of FIG. 5A. The monitoring begins at block 522, in which segment occupancy and path occupancy per flow are actively calculated and the multi-path data structure is updated on an ongoing basis. The path occupancy per flow may be measured using occupancy probes.

For example, at the TMNS, the number of bytes in each flow may be counted over a short time interval on the order of one second. The time stamps of the first ($TS_{first}$) and last ($TS_{last}$) packet in the interval are recorded per flow. The bandwidth in bits per second (bps) for each flow over that measurement period is the result of dividing the bit count (byte count*8) by the difference of the last and first packet time stamps:

$$BW(bps) = (bytes*8)/(TS_{last} - TS_{first}) \qquad (6)$$

Every segment along the flow path experiences this traffic.

Each TMN performs a similar measurement for each flow, encompassing all network traffic. Segment occupancy is the sum of the traffic from all flows through the segment. These occupancy probes are typically performed quite frequently, so that network session setup is not delayed and/or so that network trends may be identified and acted upon.

In block 524, a check is made to determine if occupancy is approaching capacity for any monitored segment (i.e., the occupancy is nearly equal to the bandwidth capacity). If not, control passes to block 530. If so, control passes to block 526. In block 526, one or more flows using a path that includes a nearly fully used segment are selected for rerouting. The method of selection will vary with design goals. For example, block 526 may first select flows having minimum bandwidth capacity specifications.

Following block 526, each selected flow is rerouted or divided in block 528. This involves identifying other known paths for the source-destination pair that do not include the affected segment. Rerouting involves selecting one of the other known paths for the flow, and dividing involves splitting the flow among two or more paths, one of which may be the path through the affected segment. The selection of the other known paths to use may be based upon the path and segment attributes and also upon any service specification for a flow being rerouted or divided.

In block 530, periodic measurement of jitter and latency for all known paths may be made as described above. Both a moving average over a predetermined time range (e.g., 30 minutes) and a current measurement may be stored in the multi-path data structure for both jitter and latency for each path. This allows calculation of an exponential moving average for jitter and latency, thereby giving greater weight to more recent measurements and less weight to older measurements. These periodic measurements are typically performed quite frequently so that network session setup is not delayed and/or so that network trends may be identified and acted upon.

In block 532, network error messages are monitored. When a segment failure is reported, this occurrence is identified in block 534 and control passes to block 540 from FIG. 5A. Otherwise, control passes to block 536, in which a check is made for any service request messages. If a service request message has been received, control passes to block 570 from FIG. 5A. Otherwise, control passes back to block 522.

Figure 5D:
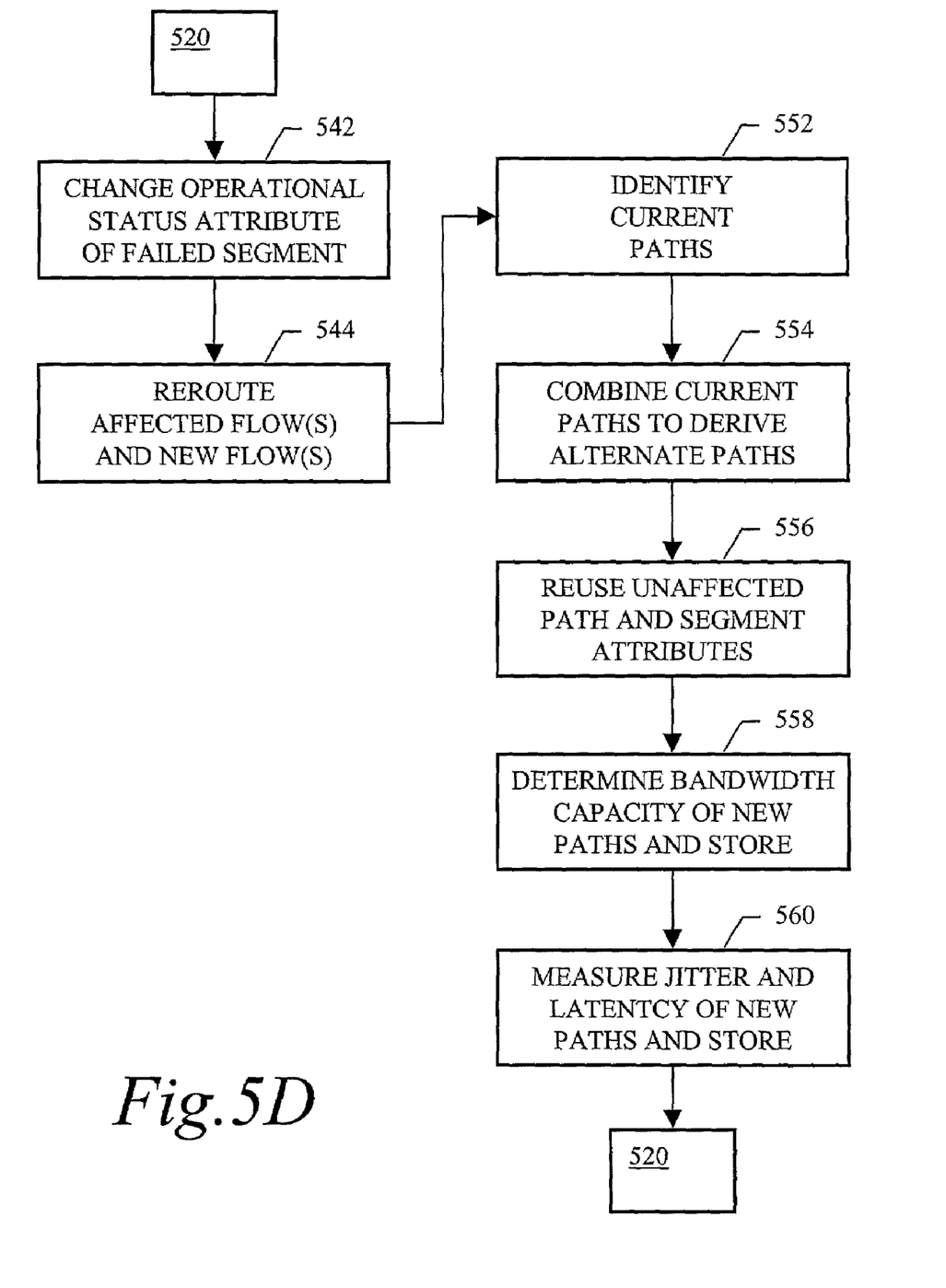

FIG. 5D is a logic flow diagram illustrating the rerouting of flows around failed segments performed in block 540 and the rebuilding of the multi-path data structure performed in block 550 of FIG. 5A. The process begins at block 542, in which the operational status attribute for the failed segment is set to false. Then all flows using paths affected by the failed segment are rerouted in block 544 as described above, including possibly dividing a flow among two or more other known paths. In addition, all new flows are routed so as to avoid the failed segment.

After a segment failure is reported, network topology discovery is re-executed and the multi-path data is regenerated. In block 552, current paths through the network are identified as discussed above. In block 554, the current paths are combined to derive alternate paths as discussed previously. Since the routing tables of intermediate routers in the network are dynamically updated to exclude the failed segment, the new topology and multi-path data should not include the failed segment.

Then in block 556, all path and segment attributes not affected by the failed segment are reused in the new multi-path data, such as by transfer from an old multi-path tree to a new multi-path tree. In block 558, bandwidth capacity is determined, as described above, for any new segments and paths discovered in block 552 or derived in block 554, and this data is stored. Finally, in block 560, jitter and latency measurements are made, as described previously, for any new paths, and this data is stored. Following this, control passes back to block 520 from FIG. 5A.

Figure 5E:
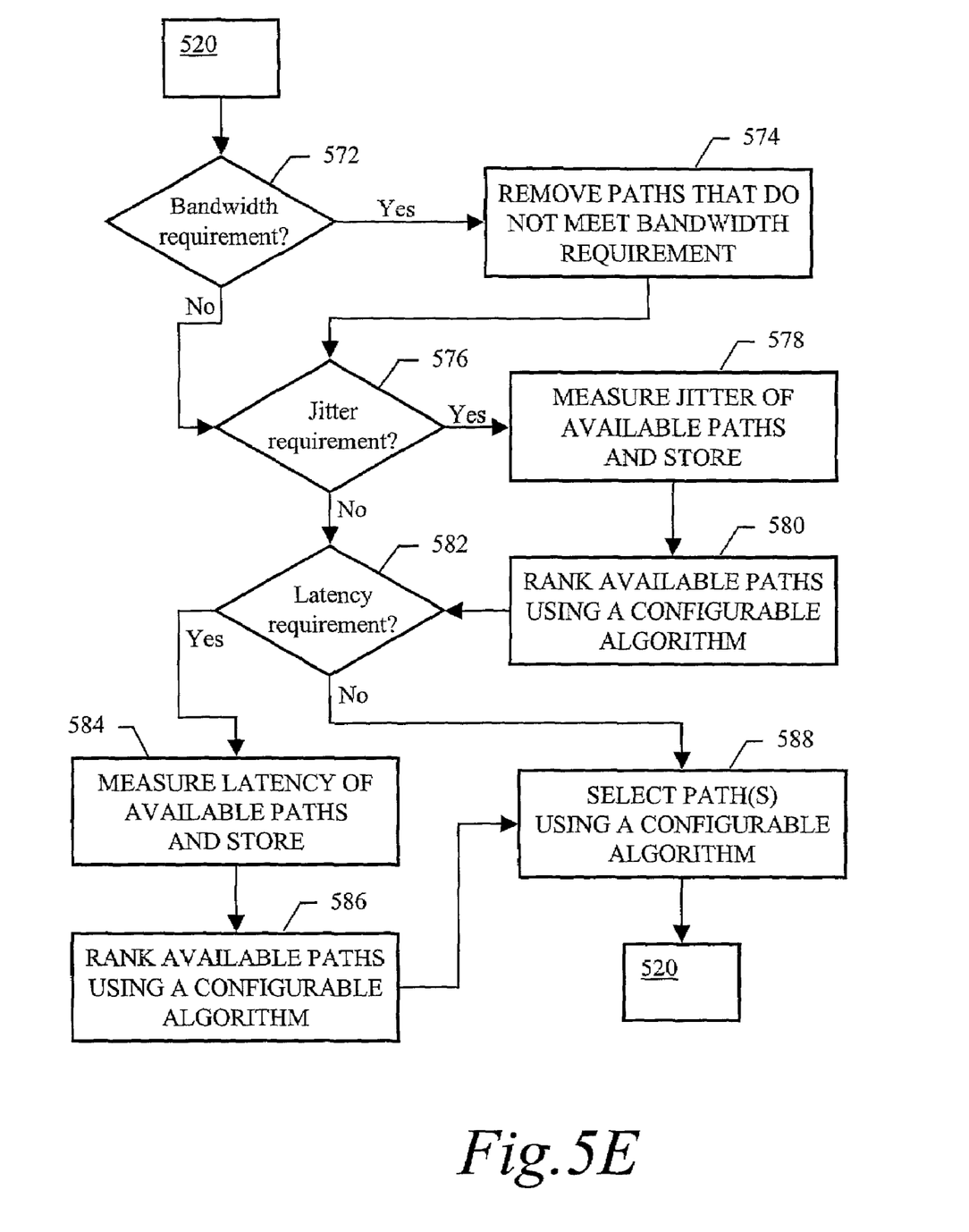

FIG. 5E is a logic flow diagram illustrating the selection of routes for network communications having service specifications performed in block 570 of FIG. 5A. The process begins at block 572, in which a check is made to determine if a bandwidth requirement is included in the service specification for a flow to be routed between two endpoints. If so, control passes to block 574, in which available bandwidth is checked for all known paths between the two endpoints, and any paths not meeting the requirement are removed from contention. An indication that the flow should be divided among two or more paths may also be set in block 574, such as if no single path meets the bandwidth requirement.

After this, or in the event that no bandwidth requirement has been specified, control passes to block 576, in which a check is made to determine if a jitter requirement is included in the service specification for the flow. If so, control passes to block 578. If not, control passes to block 582.

Jitter and latency characteristics along a path vary on a time scale of seconds, so when a service request arrives with a specific jitter and/or latency specification, a brief measurement may be made along the path to determine the real-time jitter/latency. The per-path attributes in the multi-path data structure are updated accordingly. Alternatively, the stored attributes may be used without the brief measurements being performed.

In block 578, a jitter measurement is made for each available known path between the two endpoints, in the manner described above, and the multi-path data structure is updated. Then, in block 580, the available known paths are ranked using a configurable algorithm.

For example, the configurable algorithm may consider a length of time for the session as specified in the service request. For short sessions, the path with the best real-time (instantaneous) jitter value may be chosen. For longer sessions, the path with the best average jitter value may be chosen. Intermediate length sessions may use a combination of the average and instantaneous attribute values, such as an exponential average, where the percentage of the moving average is proportional to the requested session length.

In block 582, a check is made to determine if a latency requirement is included in the service specification for the flow. If so, control passes to block 584. If not, control passes to block 588. In block 584, a latency measurement is made for each available known path between the two endpoints, in the manner described above, and the multi-path data structure is updated. Then, in block 586, the available known paths are ranked using a configurable algorithm, such as those described previously.

Then in block 588, a path (or multiple paths if flow division has been indicated) is selected using a configurable algorithm to compare the rankings of the available paths. For example, when both jitter and latency requirements are specified, the path with the optimal jitter/latency combination is chosen.

Various implementations of the systems and techniques described here may be realized in digital electronic circuitry, integrated circuitry, specially designed ASICs (application specific integrated circuits) or in computer hardware, firmware, software, or combinations thereof. While various implementations have been described above, they have been presented by way of example only, and not limitation. For example, the logic flows depicted in FIGS. 2, 5A, 5B, 5C, 5D and 5E do not require the particular order shown, or that they be performed in sequential order. In certain implementations, multi-tasking and parallel processing may be preferable.

Other embodiments may be within the scope of the following claims.

What is claimed is:

1. A machine-implemented method of managing communications, the method comprising:
   identifying a current path comprising current segments in a packet-switched network for traffic traveling from a source node to a destination node;
   identifying a detour path comprising a first path from the source node to a detour node and a second path from the detour node to the destination node; and
   converting the detour path into an alternate path comprising alternate segments for sending traffic from the source node to the destination node if the current path includes at least one current segment that will be different from the alternate segments;
   wherein converting the detour path into the alternate path comprises comparing the current segments with a list of detour segments for the detour path, determining whether the first path is a sub-path of the current path, and determining whether the current path is a sub-path of the first path; wherein the sub-path determining excludes end nodes and repeated intermediate nodes from consideration.

2. The method of claim 1, wherein converting the detour path into the alternate path further comprises concatenating the first path and the second path.

3. The method of claim 1, further comprising:
   storing values for one or more attributes for the current path;
   storing values for the one or more attributes for the alternate path;
   receiving a service specification for a network communication; and
   selectively using either the current path or the alternate path for the network communication based on the service specification and one or more of the stored values.

4. The method of claim 3, wherein the one or more attributes include jitter, latency and bandwidth.

5. The method of claim 4, wherein selectively being either the current path or the alternate path further comprises using a configurable algorithm to compare the service specification with jitter and latency characteristics for the current path and the alternate path.

6. The method of claim 3, further comprising:
   identifying failure of a segment; and
   rerouting one or more flows affected by an identified segment failure.

7. The method of claim 3, further comprising:
   identifying when occupancy of a segment becomes greater than a predefined percentage of bandwidth capacity for the segment; and
   rerouting one or more flows, which currently use the segment.

8. The method of claim 7, wherein the rerouting one or more flows comprises dividing a flow between two or more paths.

9. A method of managing machine communications in a virtual private network having three or more network nodes coupled with a larger network, the method comprising:
identifying current paths used by the larger network for traffic sent among the three or more network nodes;
combining the current paths using at least one detour node to derive alternate paths through the larger network;
storing values relating to one or more path attributes for each of the current paths and for each of the alternate paths;
receiving a service specification for a network communication; and
selecting one of the alternate paths for the network communication if the stored value for a current path indicates that the current path is unsuitable for the network communication;
wherein combining the current paths to derive alternate paths comprises identifying a detour path comprising a first path from a source node of the three or more network nodes, to a detour node of the three or more network nodes, and a second path from the detour node to a destination node of the three or more network nodes; and converting the detour path into an alternate path if the current path includes at least one segment that would not be included in the alternate path after conversion;
wherein converting the detour path into the alternate path comprises comparing current segments of the current path with a list of detour segments for the detour path, determining whether the first path is a sub-path of the current path, and determining whether the current path is a sub-path of the first path; wherein the sub-path determining excludes end nodes and repeated intermediate nodes from consideration.

10. The method of claim 9, wherein the one or more path attributes comprise bandwidth capacity, the method further comprising storing values for a segment attribute for each of a plurality of segments making up the current paths and the alternate paths.

11. The method of claim 10, further comprising:
identifying when occupancy of a segment becomes greater than a predefined percentage of bandwidth capacity for the segment; and
rerouting one or more flows, which currently use the segment.

12. The method of claim 9, wherein the one or more path attributes comprise jitter arid latency.

13. The method of claim 12, wherein selecting one of the alternate paths for the network communication further comprises comparing the service specification with exponential averages of jitter and latency for the one of the current paths.

14. The method of claim 13, wherein the exponential averages vary with an indication of length for the network communication included in the service specification.

15. A machine-accessible medium that when accessed results in a machine performing operations comprising:
identifying a current path in a packet-switched network for traffic from a source node to a destination node;
identifying a detour path comprising a first path from the source node to a detour node and a second path from the detour node to the destination node; and
validating the detour path for the source-destination pair if the current path includes at least one segment not in the detour path;
wherein validating the detour math comprises comparing current segments of the current path with a list of detour segments for the detour path, determining whether the first path is a sub-path of the current path, and determining whether the current path is a sub-path of the first path; wherein the sub-path determining excludes end nodes and repeated intermediate nodes from consideration.

16. The machine-accessible medium of claim 15, wherein the operations further comprise:
storing values relating to one or more attributes for the current path;
storing values relating to the one or more attributes for the detour path;
receiving a service specification for a network communication; and
selectively using either the current path or the detour path for the network communication based on the service specification and one or more of the stored values.

17. A network system comprising:
three or more separate networks;
three or more nodes each respectively coupled with the three or more separate networks, and with a connecting network, which enables machine communications to pass among the three or more separate networks via the three or more nodes;
means for identifying current paths for the machine communications passing through the connecting network;
means for combining the current paths to derive alternate paths through the connecting network;
means for storing values for one or more path attributes for each of the current paths and for each of the alternate paths;
means if or receiving a service specification for a machine communication; and
means for selecting one of the alternate paths for the machine communication if the stored value for one of the current paths is insufficient for the service specification;
wherein the means for combining comprises means for comparing current segments of a current path from a source node to a destination node with a list of detour segments for a detour path comprising a first path from the source node to a detour node and a second path from the detour node to the destination node, determining whether the first path is a sub-path of the current path, and determining whether the current path is a sub-path of the first path; wherein the sub-path determining excludes end nodes and repeated intermediate nodes from consideration.

18. The system of claim 17, further comprising:
means if or identifying when occupancy of a segment in one of the current paths becomes greater than a predefined percentage of bandwidth capacity for the segment; and
means for rerouting one or more flows, which currently use the segment.

19. A network system comprising:
three or more separate networks;
three or more nodes coupled with the three or more separate networks respectively, and with a connecting network, which enables machine communications to pass among the three or more separate networks via the three or more nodes;
a traffic management server coupled with a network and in machine communication with the three or more nodes, the traffic management server configured to combine current paths for the machine communications to derive alternate paths through the connecting network, and maintain a data structure to store values for one or more path attributes for each of the current paths and for each of the alternate paths to be used in selectively routing machine communications among the three or more nodes;

wherein the traffic management server as configured to compare current segments of a current path from a source node to a destination node with a list of detour segments for a detour path comprising a first path from the source node to a detour node and a second path from the detour node to the destination node, determine whether the first path is a sub-path of the current path, and determine whether the current path is a sub-path of the first path; wherein the sub path determinations exclude end nodes and repeated intermediate nodes from consideration.

20. The system of claim 19, wherein the three or more nodes are each configured to track path occupancy per flow, and wherein the traffic management server is further configured to identify when occupancy of a segment in one of the current paths becomes greater than a predefined percentage of bandwidth capacity for the segment to allow rerouting one or more flows, which currently use the segment.

* * * * *